United States Patent [19]

Neer

[11] 3,731,302

[45] May 1, 1973

[54] DIGITAL/ANALOG CONVERSION SYSTEM

[75] Inventor: Harold M. Neer, Bartlesville, Okla.

[73] Assignee: Phillips Petroleum Company, Bartlesville, Okla.

[22] Filed: Sept. 14, 1970

[21] Appl. No.: 71,903

[52] U.S. Cl. ..........................................340/347 AD

[51] Int. Cl. ..........................................H03k 13/02

[58] Field of Search ................340/347 DA, 347 AD, 340/172.5

[56] References Cited

UNITED STATES PATENTS

| | | | |
|---|---|---|---|
| 3,540,037 | 11/1970 | Ottesen | 340/347 DA |
| 3,505,668 | 4/1970 | Ottesen | 340/347 DA |
| 3,504,164 | 3/1970 | Farrell et al. | 340/172.5 |
| 3,596,266 | 7/1971 | Slawson et al. | 340/347 DA |

*Primary Examiner*—Maynard R. Wilbur
*Assistant Examiner*—Joseph M. Thesz, Jr.
*Attorney*—Young and Quigg

[57] ABSTRACT

A general purpose computer is utilized for analog to digital conversion by utilizing a switch and ladder network which cooperates with a comparison circuit and a gate to perform a conversion subroutine in the computer. Several analog inputs can be successively converted to digital form and stored in core memory. These input values, or computed values, can further be transferred to analog storage units for recording, by utilization of multiplexer switches having their output selection logic controlled by the computer program.

5 Claims, 4 Drawing Figures

INVENTOR.
H. M. NEER
BY Young & Quigg
ATTORNEYS

INVENTOR.
H. M. NEER

BY Young & Quigg
ATTORNEYS

INVENTOR.
H. M. NEER

BY Young & Quigg

ATTORNEYS

DIGITAL/ANALOG CONVERSION SYSTEM

BACKGROUND OF THE INVENTION

Digital computers with analog inputs commonly employ an external analog-to-digital conversion system which involves rather extensive hardware. Also, when several analog outputs are required, several external digital registers are commonly provided, each with an associated switch and ladder network to convert a digital number to an analog signal. A number is placed in the external register by the computer and converted to a proportional analog voltage by the ladder network.

BRIEF STATEMENT OF THE INVENTION

I have discovered that the analog-to-digital conversion procedure can be performed by a programmed subroutine within the general purpose computer, thus permitting external digital registers and associated control logic to be eliminated. This produces a substantial saving in the cost of the external apparatus which must be furnished for use with the computer.

In accordance with my invention, a switch and ladder network converts the digital output of the computer accumulator to analog form. This is compared with the unknown analog input by a comparison circuit, the output of which is gated to a skip bus on the computer.

Starting with an arbitrary number, preferably a 1 bit in the most significant place, the output of the comparison circuit indicates whether the analog input is larger or smaller than the number stored in the accumulator.

If it is smaller, the most significant bit is changed to 0.

If the analog input is greater, the skip bus is actuated to cause the computer to skip the instruction of clearing the most significant bit to 0. Thereafter, a 1 bit is inserted in the second most significant position of the accumulator register, and a second comparison made with the analog input. This process continues, proceeding from the most significant to the least significant bit in the accumulator register, the instruction of clearing the bit to 0 being skipped when the analog input signal is greater than the accumulator signal.

Thus, by successive approximation, the digital output of the accumulator becomes equivalent to the analog input signal. Thus, using an external switch and ladder network, comparison circuit and gate, conversion of the signal to digital form is effected using a subroutine of the general purpose computer. This eliminates the need for an external register and for the logic system to control the steps desired above.

The output facility is not limited to quantities which have just been read in, but may be used for outputting computed results as well.

For utilizing my novel system in conjunction with a sequence of analog inputs, such as occur in chromatographic analysis, it is often desirable to output certain values in analog form for use in display media, plotting apparatus or other equipment. To this end, I provide a plurality of storage units, each of which may be connected to the switch and ladder network through a multiplexer switching unit.

To output a value in analog form, the value is first loaded into the accumulator. Then, one of the switches of the multiplexer is selected by executing a specific input-ouput command. This command appears in the memory buffer register of the computer while it is being executed, and is used to gate the signal from the switch and ladder network into the selected storage unit.

To output a value to a different storage unit, a second multiplexer switch is similarly energized and the analog signal transferred to a second storage unit. This process may be repeated until each of the set of analog signals is stored in a different unit. Insofar as I am aware, this method of analog signal storage is novel and effects a further saving in the auxiliary equipment required for use with the general purpose computer, as opposed to providing a register plus a switch and ladder network for each analog output.

DETAILED DESCRIPTION OF THE INVENTION

The invention will be more fully understood from the following detailed description taken in conjunction with the appended drawings, in which.

Figure 1:
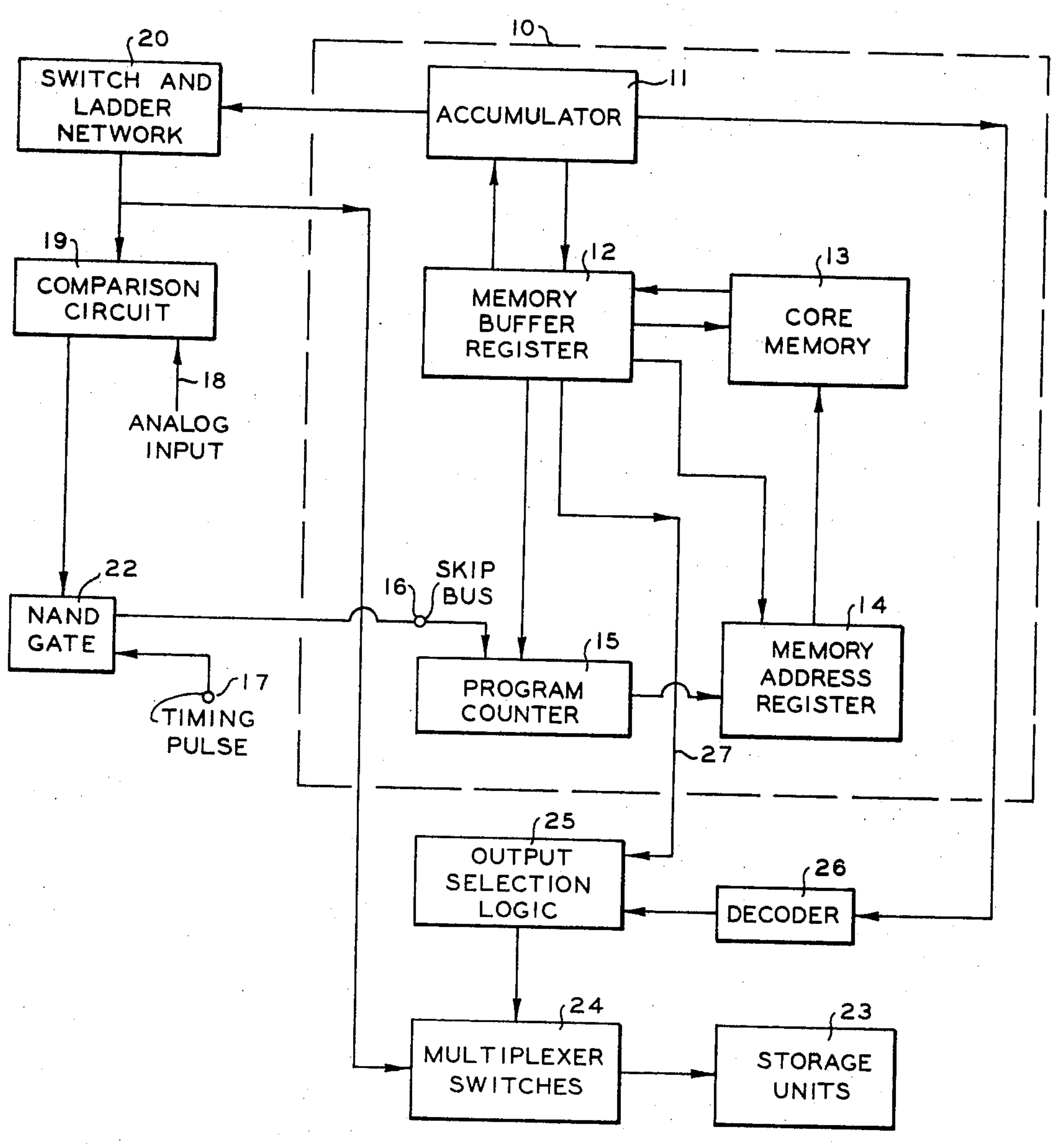
FIG. 1 is a block diagram illustrating the general purpose computer and its associated auxiliary units.

Referring now to FIG. 1, the major units of the general purpose computer are indicated by the elements within the dashed rectangle 10. For purposes of illustration, the invention will be described in connection with the Programmed Data Processor-8, a high speed stored program digital computer. It is described in detail by the *Programmed Data Processor-8 Users Handbook*, published in May 1966, by Digital Equipment Corporation, Maynard, Mass., which is incorporated by reference herein. As will become apparent to those skilled in the art, however, other types of general purpose computers can be employed to perform the invention, although details of the memory systems, programming systems, and registers may vary.

The computer includes an accumulator 11 which is a 12-bit register capable of performing arithmetic and logic operations under programmed control. The accumulator can be cleared or complemented, and the content of the accumulator 11 can be added to the content of a memory buffer register 12. As indicated, data may be transferred from the register 12 to a core memory unit 13 or, conversely, data can be transferred from the core memory unit 13 to the register 12. The core memory unit 13 provides storage for instructions to be performed and information to be processed or distributed. In the example illustrated, it is a random address magnetic core unit holding 4,096 12-bit words. It contains numerous circuits, not shown, such as read-write switches, address decoders, inhibit drivers, and sense amplifiers which perform the functions necessary to transfer information into or out of the core array but perform no arithmetic or logic operations upon the data.

A memory address register 14 selects the address in the core memory unit 13 from which information is to be withdrawn or to which information is to be transmitted. As indicated, it can be actuated by signals from the memory buffer register 12 or by signals from a program counter 15. The latter unit is a 12-bit register which determines the order in which instructions are performed. It contains the address of the core memory location from which the next instruction will be taken. Information enters the program counter 15 from the core memory unit 13 through the memory buffer register 12. Incrementation of the content of the program counter 15 establishes the successive core memory locations of the program and, upon actuation of a skip bus 16, the next instruction can be skipped.

The computer 10 passes through successive major states in executing programmed instructions. These major states are "fetch," "defer," and "execute." During the "fetch" state, an instruction is read into the memory register 12 from the core memory unit 13 at the address specified by the content of the program counter 15. The instruction is restored to core memory and retained in the memory buffer register 12. The operation code of the instruction is utilized to cause an enactment of the instruction during the following "execute" cycle.

The "defer" state is utilized in indirect addressing of the core memory unit 13, and need not be described in detail because the operations described herein can be performed without indirect addressing.

During the "execute" state, the instruction in the buffer register 12 is carried out. The instructions of interest herein are as follows:

TAD

The content of a specified memory location is added to the content of the accumulator 11 in two's complement arithmetic. The result is held in the accumulator, the original content of the accumulator is lost, and the original content of the specified memory location is restored.

ISZ

The content of a specified memory location is incremented by 1 in two's complement arithmetic. If the result is zero, the content of the program counter 15 is incremented by 1 and the next instruction is skipped. If the content is not zero, the program proceeds to the next instruction. The incremented content of the specified memory location is restored. The content of the accumulator is not affected.

AND

The AND operation is performed between the contents of a specified memory location and the contents of the accumulator.

DCA

The content of the accumulator is deposited at a specified address in the core memory 13 and the accumulator 11 is cleared.

JMS

The content of the program counter, +1, is deposited in a specified location, and the next instruction is taken from the core memory location following the one specified. The content of the accumulator is not affected.

JMP

A predetermined address is set in the program counter 15 so that the next instruction is taken from this address. The original content of the program counter 15 is lost, and the content of the accumulator 11 is not affected.

Timing pulses are produced at various times during the major states described above, one of which is present at a terminal 17.

In accordance with the invention, an analog input 18 is fed to a comparison circuit 19 wherein it is compared with the output of a switch and ladder network 20 controlled by the accumulator 11. An arbitrary number is set in the accumulator 11, for example a 1 bit in the most significant digit. The network 20 produces an analog voltage responsive to this value which is compared with the analog input in the circuit 19 to produce an output 21. This output is fed to a NAND gate 22, the output of which actuates the skip bus 16 at the proper time in the program, as determined by coincidence with a timing pulse from the terminal 17.

If the magnitude of the input signal 18 is less than that of the accumulator 11, no output is produced by the circuit 19 and the program proceeds to the next step, i.e., insertion of a bit in the next most significant position of the accumulator 11 after removal of the bit from the most significant position.

If the magnitude of the input signal 18 is greater than the accumulator content, the skip bus 16 is actuated through the gate 22, causing the computer to skip the instruction of removing the bit from the most significant position in the accumulator. This occurs at the proper time in the program cycle, as determined by a timing pulse appearing at the terminal 17.

The foregoing steps are repeated proceeding from the most significant digit to the least significant digit in the accumulator 11. In each case, if the input signal 18 is greater than the accumulator output, the bit is retained in the accumulator but if it is smaller, the bit is removed therefrom. In this fashion, a process of successive approximation occurs until the digital content of the accumulator 11 is equal in magnitude to the analog input 18. This digital value is then stored in core memory, used in computations, and/or fed to other devices which require the analog data in digital form.

Thus, the conversion is performed by a subroutine in the computer 10, with only the network 20, the comparison circuit 19 and gate 22 required as auxiliary apparatus, a substantial equipment saving over previously utilized systems.

In many cases, it is necessary to operate with several successive input signals. For example, where the analog inputs are provided by a complex chromatographic analyzer system having several detectors, there will be signals present from each detector while an analysis is being performed. In this case, it is desirable to provide storage units which can be used to store analog signals from the switch and ladder network, for use by recording apparatus or other equipment. These may be computed values; for example, the chromatogram might be corrected for baseline offset, or integrated values might be displayed.

In accordance with my invention, this can easily be effected by providing a series of storage units 23 which are selected by a set of multiplexer switches 24. The analog signal is fed from the network 20, through one of the multiplexer switches 24 to a preselected storage unit 23. At a predetermined time during operation the accumulator 11 produces an output representative of an analog signal. These signals are fed through a predetermined multiplexer switch 24, i.e., switch number 2, for operation, thus connecting a predetermined storage unit to the output of the switch and ladder network 20. At the proper time, the output selection logic unit 25 is enabled by a specific signal from the memory buffer register 12, and causes a predetermined multiplexer switch to operate. In this fashion, each of the set of analog output values can be stored in a different one of the units 23 as required during operation.

DETAILED CIRCUIT DESCRIPTION

Figure 2:
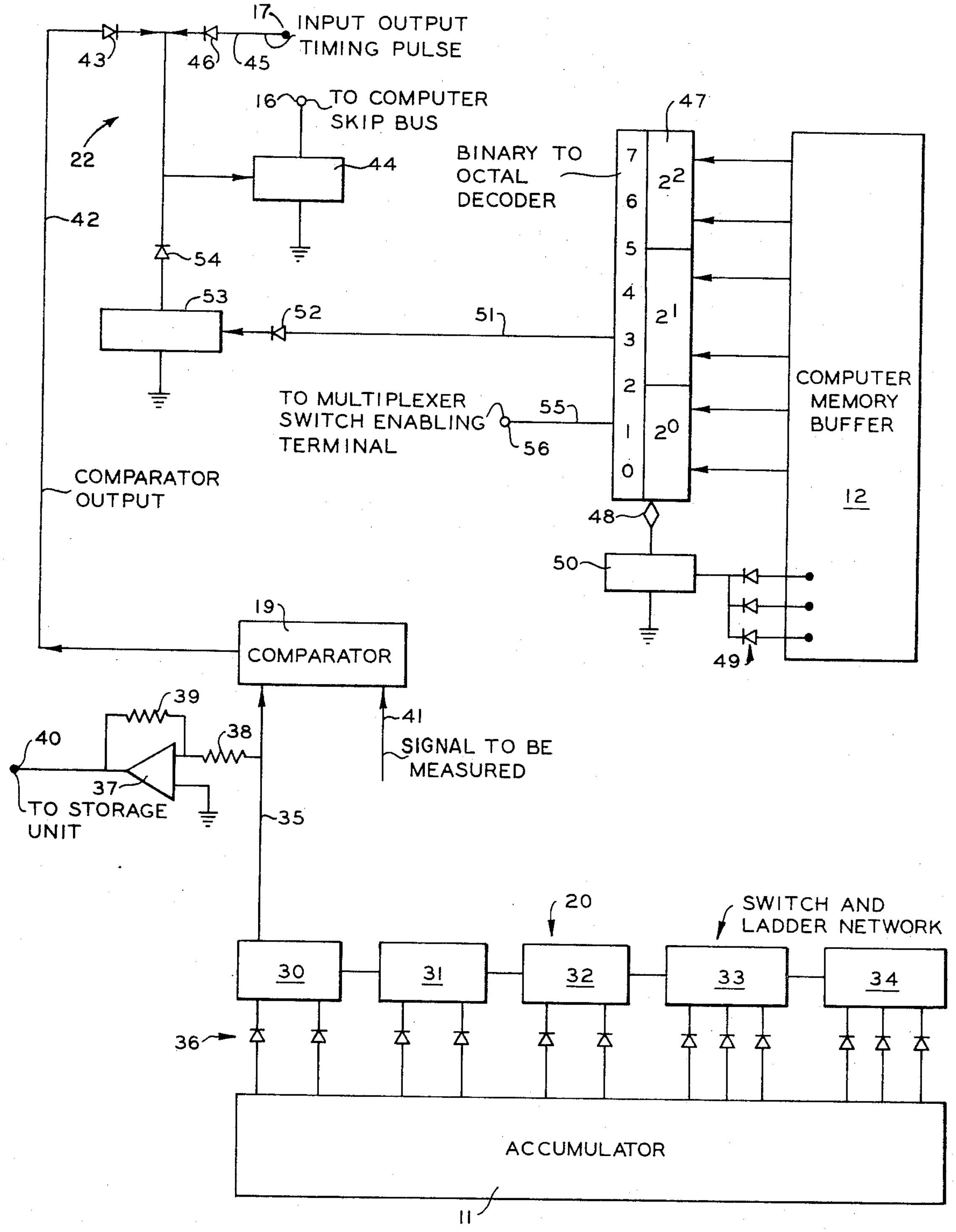
FIG. 2 is a schematic circuit diagram showing the switch and ladder network, comparator and gate circuits in more detail.

Referring now to FIG. 2, I have shown in more detail how the network 20, comparison circuit 19 and gate 22 cooperate with the elements of the general purpose computer. The switch and ladder network 20 comprises three elementary 2-bit digital to analog converters 30, 31, 32 and two 3-bit digital to analog converters 33, 34 all connected by a lead 35 to one input terminal of the comparator 19. The output terminals of the accumulator 11 are connected, respectively, through diodes 36 to the respective input terminals of the elementary digital to analog converters. By virtue of this connection, the voltage at the lead 35 is the analog equivalent of the digital output of the accumulator 11. The output of the network 20 is further fed to an operational amplifier 37 through input resistance 38, this amplifier having a feedback resistor 39. The output of the amplifier is impressed upon a terminal 40 which leads to the storage units 23, FIG. 1, through multiplexer switching unit 24 which is controlled by output selection logic 25.

Reverting to FIG. 2, the signal to be measured is impressed upon a lead 41 which is connected to the other input terminal of the comparator 19, and a signal appears at a lead 42 connected to the comparator output when the magnitude of the signal to be measured is greater than the output of the network 20.

The lead 42 is connected through a diode 43 to an inverter 44 which, in turn, is connected to the computer skip bus 16. Accordingly, the skip bus is actuated by a signal appearing at the lead 42 when this signal is coincident with an input-output timing pulse fed to the inverter 44 by a lead 45 and a diode 46, and also coincident with a specific decoded signal from the computer memory buffer 12.

The latter signal is provided by a binary to octal decoder 47 having its respective input terminals connected to the output of the computer memory buffer 12 and enabling terminal 48 which is energized by signals from the computer impressed through a set of diodes 49 and an inverter 50. When the code "3" appears at the computer memory buffer output in coincidence with the input-output timing pulse fed through the conductor 45, the skip bus can be actuated by a signal from the lead 42. To this end, the "3" terminal is connected by a lead 51, a diode 52, an inverter 53 and a diode 54 to the input of the inverter 44.

A lead 55 is connected from the "1" terminal of the decoder 47 to a multiplexer switch enabling terminal 56, thereby enabling the switch unit to be energized at a predetermined time during the computer cycle, as will hereinafter be explained. It will be evident that the circuit as thus far described compares the output of the accumulator with the analog signal to be measured. If the latter signal is of greater magnitude, the computer skip bus is energized at the proper time, as determined by an input-output timing pulse and a signal from the decoder 47, thereby causing the computer to skip the instruction of clearing the particular accumulator digit to 0. On the other hand, if the magnitude of the signal to be measured is less than the accumulator output, no pulse appears at the lead 42, and the computer skip bus is not energized.

It is a feature of the invention that the digital to analog converters 30 to 34, the comparator 19, the inverters 44, 53 and the decoder 47 are all standard module items. They are described in more detail in a publication of Digital Equipment Corporation entitled "Digital Flip-Chip Modules" (1965), as are the flip-flop circuits, multiplexer circuit and enabling gates referred to hereinafter.

Figures 3, 4:
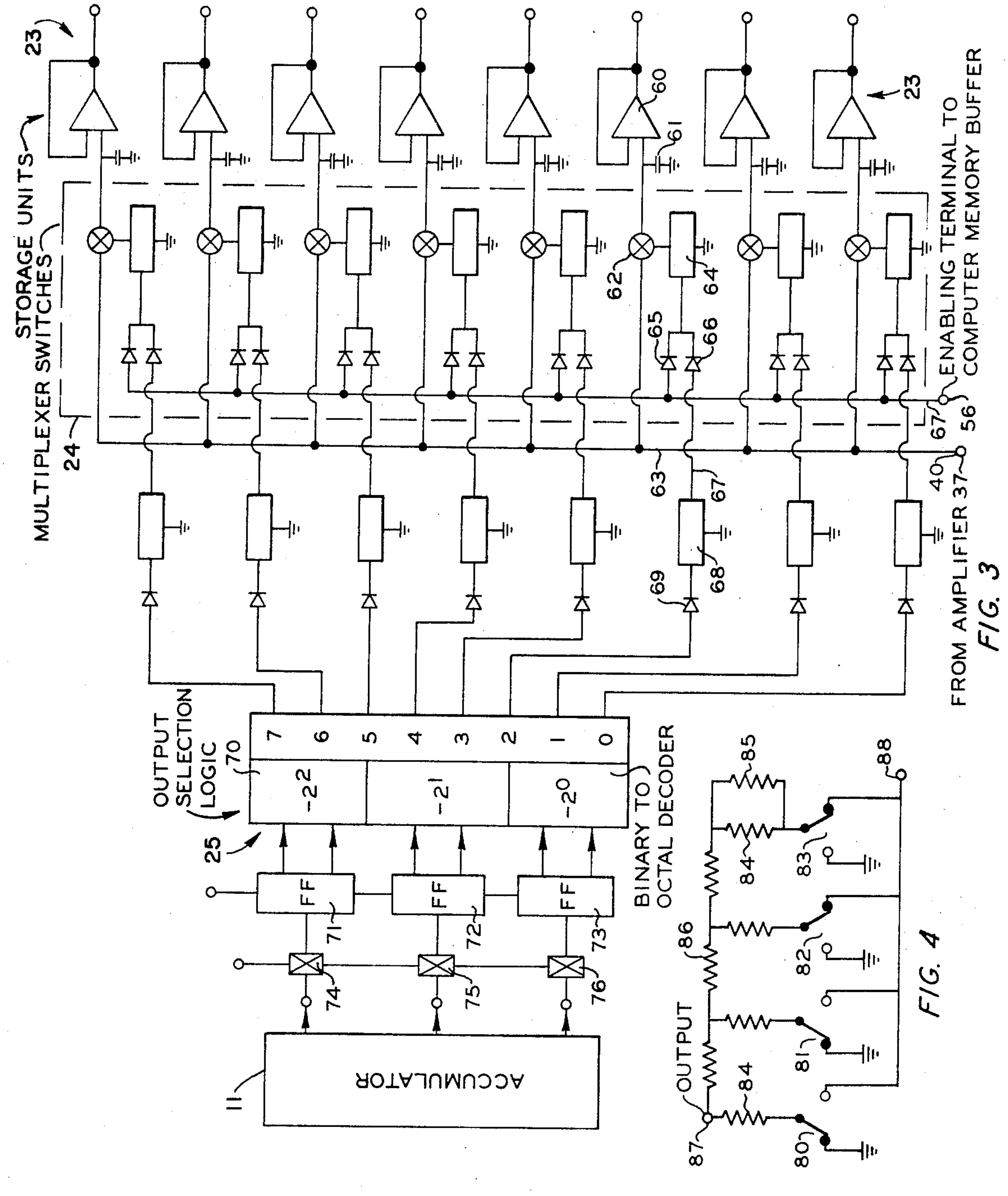
FIG. 3 is a schematic diagram of the multiplexer switch unit with its associated output selection logic and the storage units.
FIG. 4 is a schematic circuit diagram of an elementary switch and ladder network.

In FIG. 3, I have shown the storage unit 23, the multiplexer switch unit 24, the output selection logic 25 and the decoder 26 of FIG. 1 in somewhat more detail. In the example shown, there are eight storage units, each consisting of an operational amplifier 60 having a storage capacitor 61 connected between each non-inverting input and ground. Each amplifier is connected by a solid state switch 62 and a lead 63 to the terminal 40, FIGS. 2 and 3, which receives the output of the network 20. Connected to each switch 62 is an inverter 64 which, in turn, has its input connected to two diodes 65 and 66. Each diode 65 is, in turn, connected by a lead 67 to the multiplexer switch enabling terminal 56, FIGS. 2 and 3. Each diode 66 is connected by a lead 67, an inverter 68, and a diode 69 to one output terminal of a binary to octal decoder 70, the input terminals of which are connected through flip-flop circuits 71, 72, 73 and enabling gates 74, 75 and 76 to the accumulator 11 of the computer.

Thus, each switch 62 is enabled when a pulse at the terminal 56 is coincident with a signal from the decoder 70 corresponding to the particular multiplexer switch selected for operation. The octal number thus selected is, in turn, determined by the output of the accumulator by means of the flip-flop circuits, which are set from the accumulator by a program step, prior to loading an output storage unit. Also, the analog value to be outputted is determined by contents of the accumulator at the time of output. Assume that the apparatus of the invention is utilized to output the successive values of eight components of a stream analyzed by a chromatograph. When a digital quantity representing the amount of the first component has been calculated by reading in detector data from terminal 41, FIG. 2, the number 1 is programmed to appear in the accumulator 11 and to be loaded into flip-flop circuits 71, 72, 73 at an appropriate part of the computer cycle, thus energizing the "1" terminal of the decoder 70 and enabling the corresponding switch 62 when a pulse appears at the terminal 56. Thereupon, the output of the switch and ladder network 20, also controlled from the accumulator 11, is transmitted through the amplifier 37, FIG. 2, and the terminal 40, FIGS. 2 and 3, through the selected switch to the corresponding storage amplifier 60. The signal is stored in this unit throughout the analysis cycle, or until some other value is transmitted from the accumulator 11.

When a quantity representing the second component has been calculated, the number 2 is programmed to appear in the accumulator 11 during a predetermined part of the cycle, and to be loaded into flip-flop circuits 71, 72, 73. This produces an output at the output terminal "2" of the decoder 70 and selects a corresponding storage amplifier to receive the analog signal from the network 20 representing the magnitude of the second component. This operation is repeated successively as the magnitudes of the remaining components are calculated, or for any other computed value or input data which it is desired to read out.

Referring now to FIG. 4, I have illustrated a simple switch and ladder network. This includes four switches 80, 81, 82 and 83 which could be actuated, for example, by the first four digital positions of the computer accumulator 11. In the example shown, the two most significant digits are zero and consequently the switches 80, 81 are grounded. The next two positions contain a 1 and, accordingly, the switches 82, 83 are energized. Each switch has a series resistor 84 of value 2R, where R may be any appropriate value, and a terminating resistor 85, also of value 2R, connected in parallel with the last resistor 84. Three series connected resistors 86 of value R connect the resistors 84, 85 to an output terminal 87. A reference voltage appears at a terminal 88. With the switches in the position shown, and a reference voltage of −10 volts, the output is zero volts (0X ½ ×−10) plus zero volts (0X ¼ ×−10) plus 20/16 volts (1 ×−10 × ⅛) plus 10/16 volts (1 ×−10 × 1/16) or −30/16 volts representing the digital number 0011.

COMPUTER PROGRAM

While the over-all operation has been described heretofore in considerable detail, the following represents in assembly language, with explanations, the computer program required to execute the successive approximation subroutine, also to select a storage unit for receipt of an analog value to be outputted.

| Instruction Code | Explanation |
|---|---|
| CONVRT, CLA | Clear accumulator to all zeros |
| TAD | P4000/Add the octal value 4000, which places a "1" in the most signifcant bit position. (4000 octal = 100 000 000 000 in binary.) |
| SLA | Skip the next instruction, if analog input is larger than present contents of accumulator. |
| CLA | Clear accumulator if analog input is smaller. Since we have generated only one bit so far, we can simply use the clear command. |
| TAD | P2000/Add the octal value 2000, which puts a "1" in the next most significant position. |
| SLA | Skip if analog input is larger than present accumulator contents. |
| AND | P4000/This command clears the second most significant bit, but leaves unchanged the most significant bit. |
| TAD | P1000/Enter 1 in the 3rd most significant bit position. |
| SLA | Skip if analog input is larger. |
| AND | P6000/Clear 3rd most significant bit, but leave unchanged the first two bits in the accumulator. |

A similar procedure is repeated for the remaining digits of lesser significance, so that the unknown analog input is successively approximated, beginning with the most significant bit and proceeding to the least significant bit.

Typical instructions required to output analog values to the analog storage units:

| Instruction Code | Explanation |
|---|---|
| CLA | Clear accumulator. |
| TAD | P1/Enter 1 into accumulator from core memory. |
| SELECT | This symbol would be defined such that the number 1 contained in the accumulator would be transferred to flip flops 74, 75, and 76, which would cause multiplexer switch 1 to be selected, ready to output data to storage unit 1. |
| TAD | OUT 1/Place the first value to be outputted into the accumulator from a location in core memory. It is assumed that this value has been obtained and stored at the specific location by means of a computer program, not shown, designed for the particular application, such as chromatograph data from a particular type of analysis. |
| OUTPUT | This command would cause a load signal to appear at terminal 56, FIGS. 2 and 3, causing the output of switch and ladder network 20, which is the analog equivalent of the number in the accumulator, obtained from the previous command, to be transferred to analog storage unit number 1 through multiplexer switch number 1. |
| TAD | P2/Enter 2 into accumulator. |
| SELECT | Transfer to flip flops 74, 75, and 76, causing multiplexer switch number 2 to be selected. |
| TAD | OUT 2/Place second value into accumulator. |
| OUTPUT | Output second value to storage unit 2. |

Other values may be outputted in a similar manner.

It is worth noting that the computer operates at very high speed, such that new data could be read in, processed, and read out as often as several times per second, if desired. If, for example, a new value is entered into a particular analog storage unit several times per second, and if a strip chart recorder is connected to the output of that storage unit, an essentially continuous graphical record of the particular variable can be made available.

It will be apparent that I have achieved the objects of the invention in providing a system for analog to digital conversion of an input signal utilizing a subroutine of the general purpose computer to effect the conversion by a successive approximation process. Also, where a succession of numerical values are to be outputted in analog form, I have provided a system for separately storing these signals under control of the computer through operation of a multiplexer switch and logic circuit. Finally, I have achieved these objectives at lower cost than would result using a conventional analog to digital converter arrangement, and using a conventional separate storage register, each with separate switch and ladder network, for each analog output.

I claim:

1. A digital/analog conversion system comprising:

a general purpose computer having an internal accumulator providing a digital output, and an integral programming means, said programming means being programmed to successively enter by a plurality of first steps individual ones of a corresponding plurality of digits in said accumulator in the order of their significance and to subsequently clear in a corresponding plurality of second steps alternating with said plurality of first steps individual ones of said plurality of digits from said accumulator in the order of their significance, and a skip bus connected to said programming means and being selectively actuatable to cause the skipping of individual ones of said plurality of second steps to thereby leave the corresponding digit in said accumulator and to proceed to the next one of said plurality of first steps;

a switch and ladder network external to said computer and connected to the digital output of said accumulator to provide an analog output signal representative thereof;

a comparator external to said computer and connected to the output of said switch and ladder network to produce a comparator output representative of the difference between the switch and ladder analog output signal and an analog input signal;

and a gate connecting the comparator output to said skip bus to cause the skipping of the respective second step of clearing a digit from said accumulator when said analog input signal is greater than said switch and ladder analog output signal.

2. In the system of claim 1, means for feeding analog input signals successively to said comparator in timed relation whereby the output of said accumulator successively represents the digital value of said signals, a plurality of analog output storage units;

a multiplexer switch arranged to connect the output of said switch and ladder network selectively to said storage units;

said general purpose computer having means for producing a timing signal identifying the completion of the conversion of one of said analog input signals to the corresponding digital value;

and means responsive to said timing signal to actuate said multiplexer switch, thereby connecting a respective one of said storage units to the output of said switch and ladder network.

3. The system of claim 1 wherein said gate is actuated by a timing signal produced by said general purpose computer.

4. The system of claim 3 wherein said comparator is a high speed difference amplifier which compares two input voltages and indicates which is the more negative, and said gate comprises two diodes, a transistor inverter and leads connecting a common terminal of said diodes to said inverter.

5. The system of claim 4 wherein said switch and ladder network comprises an output terminal, a plurality of series resistors connected to said terminal, a unit comprising a resistance and a double-pole switch connected to each terminal of said resistors, one terminal of each switch being grounded, and leads connecting the other terminal of each switch to an input terminal.

* * * * *